(12) United States Patent  (10) Patent No.: US 8,543,402 B1
Ma  (45) Date of Patent: Sep. 24, 2013

(54) SPEAKER SEGMENTATION IN NOISY CONVERSATIONAL SPEECH

(75) Inventor: Jiyong Ma, San Diego, CA (US)

(73) Assignee: The Intellisis Corporation, San Diego, CA (US)

(*) Notice: Subject to any disclaimer, the term of this patent is extended or adjusted under 35 U.S.C. 154(b) by 153 days.

(21) Appl. No.: 13/097,620

(22) Filed: Apr. 29, 2011

Related U.S. Application Data

(60) Provisional application No. 61/329,703, filed on Apr. 30, 2010.

(51) Int. Cl.
*G10L 15/06* (2013.01)

(52) U.S. Cl.
USPC ........... 704/243; 704/245; 704/246; 704/254; 704/256.4

(58) Field of Classification Search
USPC ................ 704/243, 245, 246, 231, 233, 241, 704/253, 232, 254, 256, 256.4
See application file for complete search history.

(56) References Cited

U.S. PATENT DOCUMENTS

| | | | | |
|---|---|---|---|---|
| 4,837,830 A * | 6/1989 | Wrench et al. | ................ | 704/238 |
| 5,787,394 A * | 7/1998 | Bahl et al. | ................ | 704/238 |
| 6,182,037 B1 * | 1/2001 | Maes | ................ | 704/247 |
| 7,676,363 B2 * | 3/2010 | Chengalvarayan et al. | .. | 704/233 |
| 2004/0107100 A1 * | 6/2004 | Lu et al. | ................ | 704/238 |
| 2004/0260550 A1 * | 12/2004 | Burges et al. | ................ | 704/259 |
| 2007/0100608 A1 * | 5/2007 | Gable et al. | ................ | 704/209 |
| 2007/0250318 A1 * | 10/2007 | Waserblat et al. | ............ | 704/236 |

* cited by examiner

*Primary Examiner* — Vijay B Chawan
(74) *Attorney, Agent, or Firm* — Pillsbury Winthrop Shaw Pittman LLP

(57) ABSTRACT

System and methods for robust multiple speaker segmentation in noisy conversational speech are presented. Robust voice activity detection is applied to detect temporal speech events. In order to get robust speech features and detect speech events in a noisy environment, a noise reduction algorithm is applied, using noise tracking. After noise reduction and voice activity detection, the incoming audio/speech is initially labeled as speech segments or silence segments. With no prior knowledge of the number of speakers, the system identifies one reliable speech segment near the beginning of the conversational speech and extracts speech features with a short latency, then learns a statistical model from the selected speech segment. This initial statistical model is used to identify the succeeding speech segments in a conversation. The statistical model is also continuously adapted and expanded with newly identified speech segments that match well to the model. The speech segments with low likelihoods are labeled with a second speaker ID, and a statistical model is learned from them. At the same time, these two trained speaker models are also updated/adapted once a reliable speech segment is identified. If a speech segment does not match well to the two speaker models, the speech segment is temporarily labeled as an outlier or as originating from a third speaker. This procedure is then applied recursively as needed when there are more than two speakers in a conversation.

6 Claims, 5 Drawing Sheets

SPEAKER SEGMENTATION IN NOISY CONVERSATIONAL SPEECH

CROSS-REFERENCE TO RELATED APPLICATIONS

The present application claims the benefit of U.S. Provisional Application No. 61/329,703, filed Apr. 30, 2010, entitled "Speaker Segmentation in Noisy Conversational Speech," which is incorporated herein by reference in its entirety.

BACKGROUND OF INVENTION

1. Field of the Invention

The present invention relates generally to voice recognition and, more particularly, to speaker identification and segmentation.

2. Description of the Background Art

Speaker segmentation is the automatic detection and tracking of the beginning and end of a speaker's speech, with the detected speech segment corresponding only to the speaker. A number of applications for speaker segmentation in conversational speech exist, such as automatic speech to text translation, speaker online adaptation for automatic speech recognition, and automatic information retrieval and extraction, with the conversational speech received from a number of different sources, including over telephone. These applications demand speaker segmentation systems that can automatically detect, track and segment multiple speakers' speech in a conversation.

Traditional approaches to identifying speakers in a conversational speech sample typically rely on prior training, and therefore some degree of knowledge of the speaker's speech characteristics. There are many approaches available for speaker segmentation such as Bayesian Information Criterion ("BIC") and Generalized Likelihood Ratio ("GLR"). A simple approach is based on the difference between a speaker model and a feature vector. This approach however does not have good performance, especially when the speech segments are short. The model based approach has good performance in speaker segmentation, but it also needs a long manually labeled speech segment to train the speaker model.

Accordingly, what is desired is a robust speaker segmentation methodology for the detection and tracking of individual speakers in conversational speech.

SUMMARY OF INVENTION

Embodiments of the invention include a method comprising identifying a first speech segment as corresponding to a first speaker, updating a first speech model corresponding to the first speaker using the first speech segment, correlating a second speech segment to the first speech model, and updating a second speech model corresponding to a second speaker using the second speech segment based on insufficient correlation of the second speech segment to the first speech model, or updating the first speech model using the second speech segment based on sufficient correlation of the second speech segment to the first speech model.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
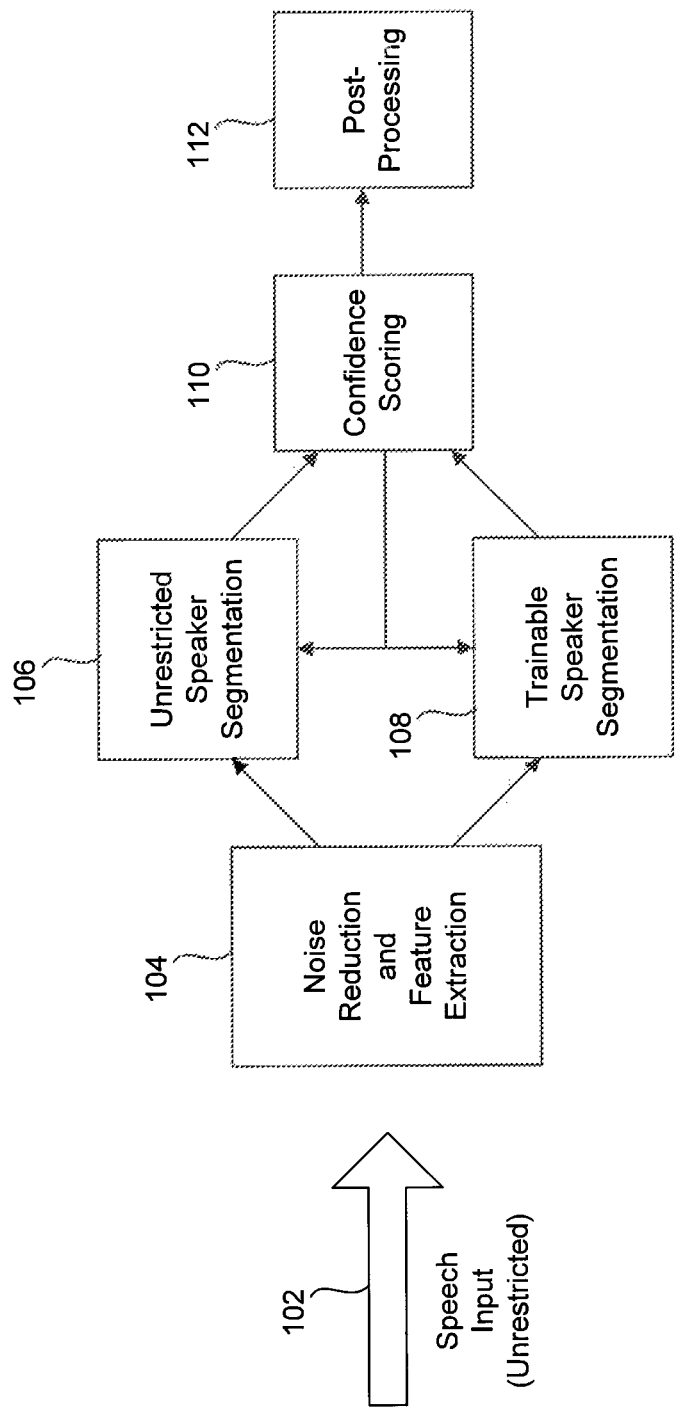
FIG. 1 is a speaker segmentation system illustrating components used in the segmentation of conversational speech, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, it would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

In a conversation, there are many short speech segments. A speech segment may contain only one word with short duration, such as the words "yes" or "no". It is hard to learn an accurate statistical speaker model with such short speech segments for speaker recognition tasks, because the speech segment may not contain rich phonetic information to distinguish speaker identities. As a result, prior attempts at speaker segmentation, which typically rely on extensive training in order to identify speakers, would be unable to resolve a speaker using such a small amount of training data.

Moreover, prior attempts at speaker segmentation require not just information regarding the identity of a speaker through training, but also information regarding a number of speakers involved in a conversation, and any speakers not involved in the conversation. However, in multiple speaker segmentation tasks, there is no a priori information available about the number and the identity of speakers in a conversation. Additionally, co-channel interference from a background speaker's voice (e.g., ambient babble or chatter) may be present.

A solution to address speaker segmentation under unrestricted conditions uses an online adaptive learning approach in order to learn reliable a speaker model from short speech segments, in accordance with an embodiment of the present invention. The system starts learning a small and un-reliable speaker model with a short speech segment, and then the system adapts the speaker model with speech segments that match well to this model.

For the initial speech segment, there is not enough accumulated speech to train an accurate speaker model. In order to increase accuracy, the initial speech segment is lengthened by merging speech segments close to it. By way of example, and not limitation, the two speech segments before and after this initial speech segment are merged. These segments should occur in close temporal proximity to the initial speech segment, such as within 50 ms, in accordance with a non-limiting exemplary embodiment of the present invention. Pitch contour continuity is used to verify if the adjacent speech segments are sufficiently close to the initial speech segment. Once the new expanded speech segment is identified, this speech segment is used to adapt the speaker model. The small initial speaker model is thereby gradually updated and expanded to a large speaker model in a on-line adaptive way with speech segments identified as originating from the same speaker.

II. Pre-Processing, Noise Reduction, and Feature Extraction

FIG. 1 is a speaker segmentation system 100 illustrating components used in the segmentation of conversational speech, in accordance with an embodiment of the present invention. A speech input 102 is provided to system 100, the exact characteristics of which are unknown a priori, in accordance with a farther embodiment of the present invention. By way of example, and not limitation, speech input 102 may be speech input being monitored and recorded from live telephone or radio communications.

The speech input 102 is provided to noise reduction module 104, in accordance with an embodiment of the present invention. Noise reduction module 104 functions to separate speech components from background noise, a process referred to as Voice Activity Detection ("VAD"). In order to improve VAD in noisy conditions, a noise reduction approach is applied, in accordance with an embodiment of the present invention. The noise reduction may comprise, in accordance with a farther embodiment of the present invention, an algorithm for noise detection and tracking of dynamic variations of noises.

In the front-end speech processing of noise reduction module 104, a short-term Fast Fourier Transform ("FFT") is applied to time domain speech signal of speech input 102 to obtain a speech spectrogram. In accordance with an embodiment of the present invention, the speech spectogram provides frequency data for the speech input 102 in a set of bins, each bin corresponding to a frequency response range. The noise signal at each frequency bin is dynamically updated according to a probability that speech is present or absent, in accordance with an embodiment of the present invention.

In accordance with a further embodiment of the present invention, a modified Weiner filter is applied to reduce noise, although one skilled in the relevant arts will appreciate that other noise filtering techniques may be used, and the use of a Weiner filter is provided by way of example, and not limitation. The speech input 102, after application of noise reduction techniques, is then segmented into silence and speech segments, in accordance with an embodiment of the present invention. In accordance with an additional embodiment of the present invention, pitch information can also be applied to VAD in order to identify speech segments, although this technique may provide false positives when background noise consists of babble or chatter from a third-party speaker.

An additional component of pre-processing at module 104 is feature extraction, in accordance with an embodiment of the present invention. As noted above, features may be represented by computing binned frequency responses from the short-term temporal speech spectogram. In accordance with a further embodiment of the present invention, features are each stored in entries of a vector data structure corresponding to a segment of speech under analysis.

The speech features may include, by way of example and not limitation, MEL scale ceptrum coefficients, log energy of sub-bands, linear predictive coefficients, and pitch information. Additionally, the speech data is usually not normalized, in accordance with an embodiment of the present invention, as raw amplitude of the features may provide clues that assist in speaker segmentation. In a non-limiting example, two speakers may be communicating via telephone, but one speaker's voice is heard more loudly than the other. Information regarding the amplitude of the two speaker's respective voice signals would therefore be helpful in distinguishing the speakers.

III. Unrestricted Speaker Segmentation

The feature extracted audio is then provided to one of two potential segmentation modules, either or both of which may be available in a particular implementation, in accordance with an embodiment of the present invention. Unrestricted speaker segmentation module requires no a priori knowledge regarding a number of speakers speaking in speech input 102, nor when such speech occurs.

Unrestricted speaker segmentation means that there is no any priori information about when and how many speakers are in a conversational speech. Ideally, in particular when initially learning the first speaker model, for each speech segment under analysis, there is no overlap in speech from two or more speakers in order for optimal speaker segmentation, although one skilled in the relevant arts will recognize that the mechanisms detailed herein will automatically correct for incorrect identifications, including those based on speech overlap, given sufficient additional segments.

Overlapping speech segments can be detected using multiple-pitch detection and tracking approaches, in accordance with an embodiment of the present invention. When multiple pitches are detected in a speech segment, this speech segment may contain speech from multiple speakers, and this information can be used to train the speaker models accordingly.

If a speech segment is relatively long (e.g., 5 or 10 seconds), a reliable statistical model can likely be learned from these speech segments. For a real-time segmentation system, a small latency may occur, because the system needs to identify a succeeding speech segment which may last about 500 ms.

Figure 3:
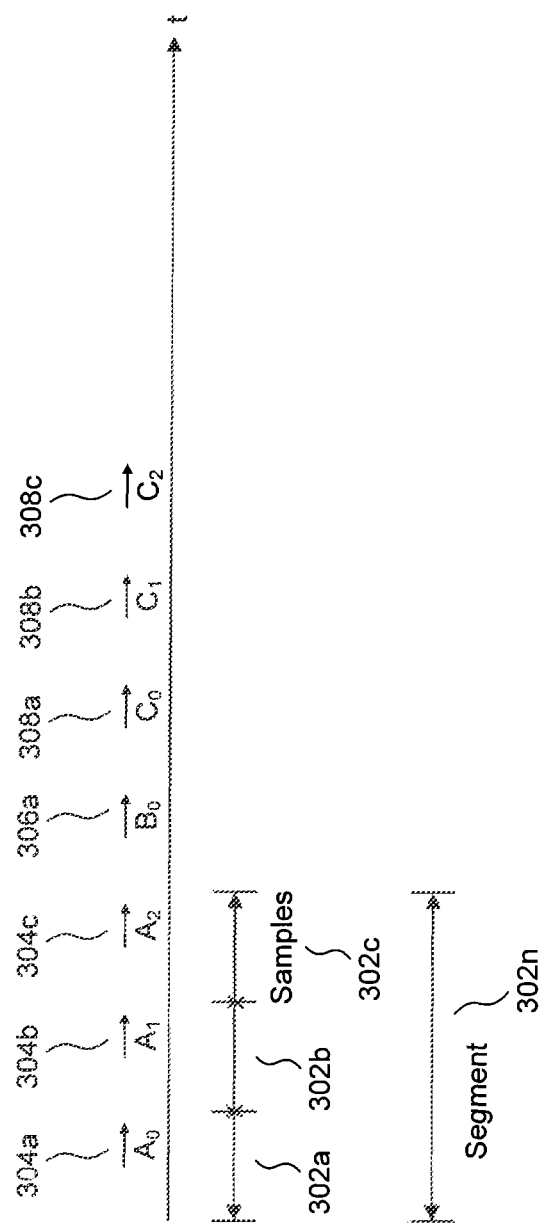
FIG. 3 illustrates a time-domain mapping of feature vectors, in accordance with an embodiment of the present invention.

After a short delay, the system first identifies one longest speech segment and, merges adjacent speech segments if they are close to each other, for instance within 100 ms of each other, and also if they are separately determined to originate from the same speaker, in accordance with an embodiment of the present invention. FIG. 3 illustrates a time-domain mapping 300 of feature vectors, in accordance with an embodiment of the present invention. In a non-limiting exemplary embodiment, feature vectors 304a, 304b, and 304c correspond to speech samples uttered by a same speaker. Additionally, feature vectors 308a, 308b, and 308c correspond to a second speaker, while feature vector 306a corresponds to silence.

In order to verify if the speech segments are from the same speaker, pitch information is extracted from the voiced speech, and it is used in verification, in accordance with an embodiment of the present invention. In the time-domain mapping 300, samples 302a, 302b, and 302c occur in close proximity to each other (e.g., within 100 ms), and further have similar pitch information, in accordance with an embodiment of the present invention. Accordingly, these samples are treated as a single segment 302n corresponding to a first speaker. Using this speech segment 302n, a statistical model is learned, which trains for the identification of speech from the first speaker.

Figure 2:
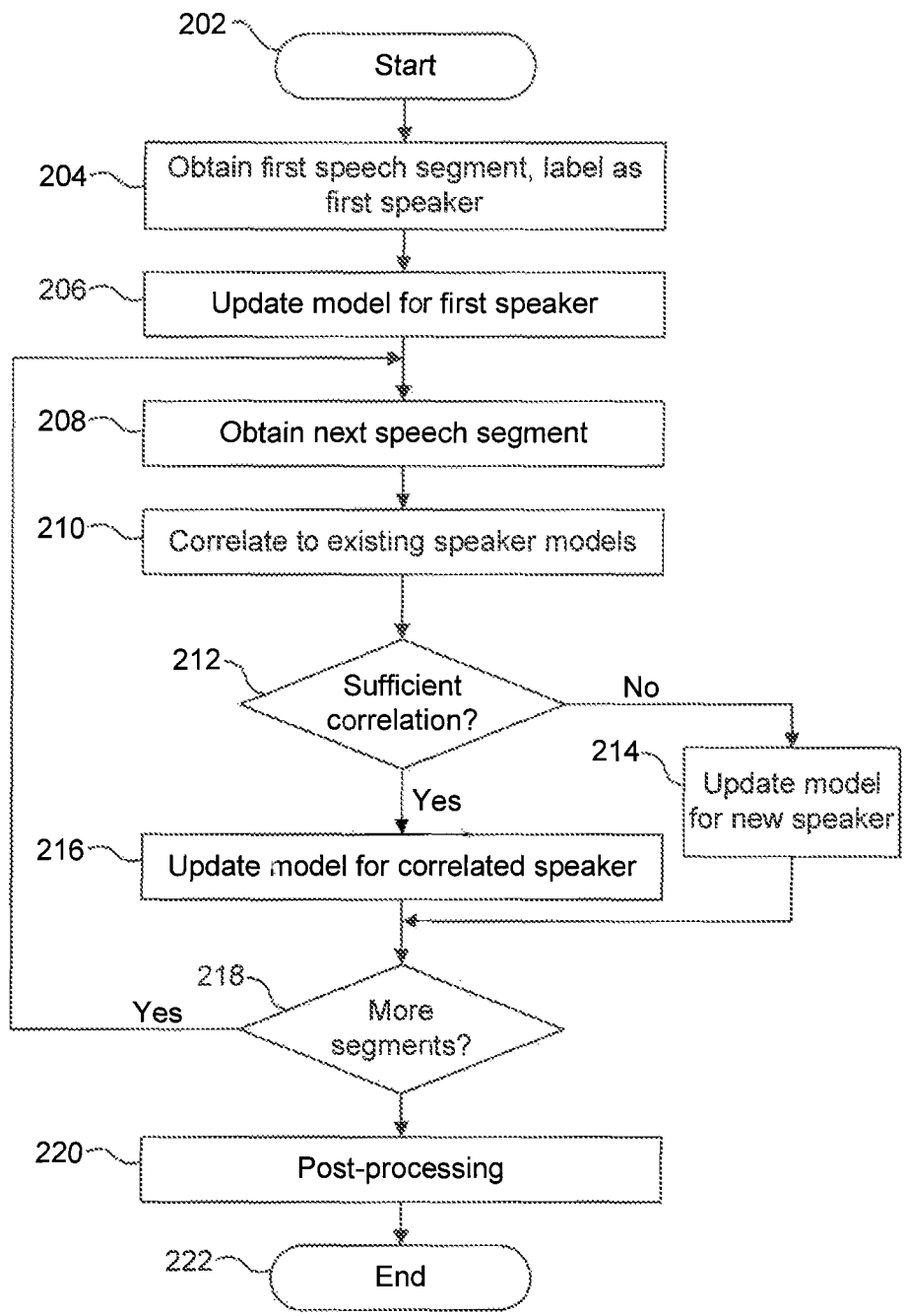
FIG. 2 is a flowchart illustrating steps by which speakers are identified using unrestricted speaker segmentation, in accordance with an embodiment of the present invention.

The mechanism of unrestricted speaker segmentation 106 is described further with regard to FIG. 2. FIG. 2 is a flowchart 200 illustrating steps by which speakers are identified using unrestricted speaker segmentation, in accordance with an embodiment of the present invention. The method begins at step 202 and proceeds to step 204 where a first speech segment is obtained, in accordance with an embodiment of the present invention. This first speech segment is treated as corresponding to a first speaker, and accordingly a Universal Background Model ("UBM") is trained for the first speaker based on the first speech segment at step 206, in accordance with an embodiment of the present invention.

The UBM model is used as an a priori statistical model. The UBM is updated/adapted frame-by-frame, with a frame delay of 10 ms and a speech segment delay as long as 500 ms, in accordance with an embodiment of the present invention, although one skilled in the relevant arts will appreciate that delays and other attributes of speaker segmentation will vary among implementations, and these delays are provided by way of example, and not limitation.

After the first speaker model is learned for the first speaker, any subsequent speech segments are scored with the model. Subsequent speech segments are labeled as corresponding to the first speaker, such as by association with an ID for the first speaker, if the scores are greater than a threshold, in accordance with an embodiment of the present invention. In accordance with a farther embodiment of the present invention, a subsequent speech segment where the scores are below the threshold is labeled as unknown, or as belonging to a separate, second speaker.

At step 208, such a second speech segment is obtained, and the second speech segment is correlated to the first speaker model in order to obtain a score, in accordance with an embodiment of the present invention. At step 212, a determination is made as to whether the score indicates sufficient correlation between the second speech segment and the first speaker model, based on the score.

If there is not sufficient correlation, then at step 214 the second speech segment is identified as unknown, in accordance with an embodiment of the present invention. In accordance with a further embodiment of the present invention, the second speech segment is associated with an ID for a second speaker. An ID for the second speaker may be created if no prior speech segment has been associated with the second speaker. For those speech segments labeled as unknown, if the duration is of a sufficient length, and the speech segment is isolated from the speech segments from the first speaker, then the speech segment is labeled as a speech segment from a second speaker, and a second speech model for the second speaker is trained using this speech segment, in accordance with an embodiment of the present invention.

If, instead, there is sufficient correlation based on the score, then the first speaker model is updated using the second speech segment at step 216, in accordance with an embodiment of the present invention. This means that the second speech segment has been identified as having been uttered by the first speaker, and accordingly should be utilized to further train the first speaker model.

For a speech segment, such as speech segment 302n of FIG. 3, if the score of the speech segment is higher than a threshold, the speech segment is labeled as from the first speaker, and is used to adapt the first speaker model. As noted above, for the initial speech segment, there is not enough accumulated speech to train an accurate speaker model. In order to increase accuracy, the initial speech segment is lengthened by merging speech segments close to it. By way of example, and not limitation, the two speech segments before and after this initial speech segment are merged. These segments should occur in close temporal proximity to the initial speech segment, such as within 50 ms, in accordance with a non-limiting exemplary embodiment of the present invention. Pitch contour continuity is used to verify if the adjacent speech segments are sufficiently close to the initial speech segment. Once the new expanded speech segment is identified, this speech segment is used to adapt the first speaker model. In this way, the first speaker model is continuously adapted once a reliable speech segment is identified. The speaker model can also be expanded when more training data is available, in accordance with an embodiment of the present invention At step 218, a determination is made as to whether additional speech segments are present, in accordance with an embodiment of the present invention. If so, these segments are analyzed, as above, for sufficient correlation with either the first speaker model, or a second speaker model corresponding to the second speaker, in accordance with an embodiment of the present invention. If sufficient correlation exists at step 212 with either the first or second speaker model, then the corresponding model is updated at step 216. Otherwise, at step 214, the additional speech segment may be labeled as unknown, or possibly as belonging to a third speaker, in accordance with an embodiment of the present invention.

Optionally, at step 220, post-processing as shown in module 112 may take place in order to further refine the speaker segmentation, usually in an offline mode, in accordance with an embodiment of the present invention. Post-processing is described in further detail below. The method then ends at step 222.

In accordance with an embodiment of the present invention, once the first speaker model is updated, speech segments with low scores are re-scored against the first speaker model. In an additional embodiment of the present invention, all, or a subset of all, prior speech segments are re-scored against the first speaker model, and any additional speaker models. If the new score of a speech segment is higher than the score threshold, then the speech segment is labeled as corresponding to the first speaker ID, meaning it is now identified as having been uttered by the first speaker. In accordance with a further embodiment, this speech segment is also used to update the first speaker model, whereupon the first speaker model is once again applied. This methodology is applied recursively until all speech segments are identified, or further iterations fail to provide additional identifications.

After the first speaker model and the second speaker model are trained, all speech segments are re-scored with these two speaker models, in accordance with an embodiment of the present invention. Any re-scored speech segment can then be labeled with the first speaker ID if the speech segment matches the first speaker model, or labeled with the second speaker ID if the speech segment matches the second speaker model, or labeled as unknown otherwise. As previously noted, this process may be repeated recursively as needed.

As with the first speaker model, the second speaker model also adaptively leans using the additional speech segments that score high against the second speaker model. As more speech segments are identified and used to adapt the speaker models, the speaker models become increasingly accurate. In a typical application, approximately sixty seconds of accumulated speech from a single speaker is needed to properly estimate a speaker model, although one skilled in the relevant arts will appreciate that this timeframe will vary depending on the contents of the speech input. Once these speech segments are identified, the segmentation accuracy is improved.

This approach can be applied to single speaker segmentation, where it is known a priori that only a single speaker is speaking in speech input 102. Any outliers, such as background chatter or babble, can be labeled as an unknown or as a combined second speaker, to distinguish from the first speaker. This method can therefore be used to identify outliers from speech, such as background noises and co-channel speech interference. Identification of outliers by this methodology can also be applied to multiple-speaker segmentation.

IV. Manually Trainable Speaker Segmentation

Partial or complete training speech for a speaker can be provided in advance and used to perform initial training of speaker models using provided speech segments. Typically, the duration of speech provided to learn a speaker model may be very short, on the scale of 2 seconds, 5 seconds, or 10 seconds, which is generally insufficient to train a good speaker model. Nevertheless, after initial speaker models are learned with training speech, conversational speech (including real-time conversational speech) can be segmented with these trained models, in accordance with an embodiment of the present invention.

However, for several reasons, including changes in environment noise in speech input 102 under analysis, the training speech may not match well to the analysis speech. As a result, it remains beneficial to subsequently apply the unrestricted speaker segmentation model 106 approach to subsequent speech segments in order to update the speaker models.

If training speech is available for all speakers, the details of the speaker segmentation algorithm are as follows:
1) The training speech from all speakers are used to train a UBM model.
2) For each speaker, a speaker model is adapted from UBM model with the speaker's speech.
3) Speech segments to be labeled are scored with these trained speaker models. If a speech segment matches a speaker model, then the speaker model is adapted with this identified speech segment. Otherwise, the speech segment is labeled as an outlier.
4) The UBM model is continuously updated frame-by-frame as long as a speech segment is detected.
5) Go to step 3, using updated/adapted speaker models and the UBM model if there are still speech segments to be labeled, otherwise output speaker segmentation labels If training speech is available only for some of the speakers, the training speech is used to train speaker models corresponding to the training speakers first, then the approach to the unrestricted speaker segmentation is applied to update/adapt speaker models with training data and without training data.

Figure 4:
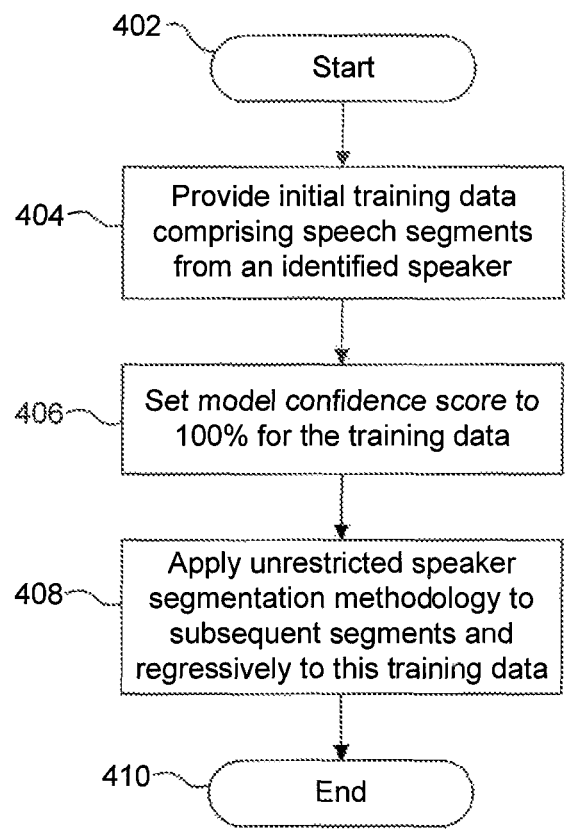
FIG. 4 is a flowchart illustrating steps by which trainable speaker segmentation is used to initiate trained unrestricted speaker segmentation, in accordance with an embodiment of the present invention.

FIG. 4 is a flowchart 400 illustrating steps by which trainable speaker segmentation is used to initiate trained unrestricted speaker segmentation, in accordance with an embodiment of the present invention. The method begins at step 402 and proceeds to step 404 where initial training data comprising speech segments from an identified speaker are provided, in accordance with an embodiment of the present invention. As noted above, the initial training data may be for a subset of speakers from speech input 102, or may include all of the speakers.

The initial training data is provided for processing as in unrestricted speaker segmentation 106. However, confidence scoring module 110 is updated to indicate a 100% confidence (perfect confidence) measure correlating each training segment to the corresponding speaker model, in accordance with an embodiment of the present invention. By way of example, and not limitation, confidence scoring module 110 is updated to provide 100% confidence feedback when a speech segment containing speech from a first speaker is correlated to a first speaker model, and likewise for any additional speakers.

At step 408, the trained speaker models can then be applied to subsequent segments, without the need for farther training data, using the unrestricted speaker segmentation 106 methodology described above, in accordance with an embodiment of the present invention. In accordance with a further embodiment of the present invention, scores provided by confidence scoring module 110 are updated for all segments, including the training segments, to allow for variations in speech input 102 that are present in new data but were not present in the training data, for example. The method then ends at step 410.

V. Confidence Scoring

Posterior probability of a speech segment computed from a speaker model can be used as a confidence score for a given speaker label corresponding to a particular speaker. However, the posterior probability computed from speaker models may not be in range of 0 and 1.0, with 1.0 representing 100% confidence. Even for training speech, the confidence score may be 0.6, where it should be 1.0. When training speech segments are available for a speaker, as described above, the posterior probability should be scaled up to 1.0. Confidence calibration with training data can therefore be performed on confidence scoring module 110.

When transcribed training data is not available, the posterior probability can also be scaled up to 1.0 for some speech segments that are known to originate from the same speaker. These speech segments are selected from speech segments that are used to train the initial speaker models.

Nevertheless, subsequent application of unrestricted speaker segmentation 106 methodology results in the confidence scores for each speech segment being dynamically updated as the speaker models themselves are updated.

VI. Post-Processing

As noted above, improved performance of the VAD relies on each speech segment detected with VAD originating from only one speaker, having no overlap with speech from a second speaker. Additionally, performance is also improved with a sufficiently long silence between two speakers' speech (e.g., 100 ms in an exemplary, non-limiting embodiment).

If these requirements are not or cannot be met, performance can nevertheless be enhanced by splitting the speech segments into smaller speech segments, in accordance with an embodiment of the present invention. It is then possible to implement bottom-up clustering algorithms to identify which speech sub-segments originate from the same speakers.

Additional post-processing, such as by post-processing module 112, can also be performed in an offline (i.e., not real-time) mode, in accordance with an embodiment of the present invention. By way of example, and not limitation, more complex algorithms with longer computational delays that would not be acceptable to real-time application may be applied to improve speaker segmentation accuracy, in accordance with a further embodiment of the present invention. Offline mode algorithms may use speaker recognition techniques, including those known by one skilled in the relevant arts, to verify speaker segmentation results obtained from real-time processing.

VII. Example Computer System Implementation

Figure 5:
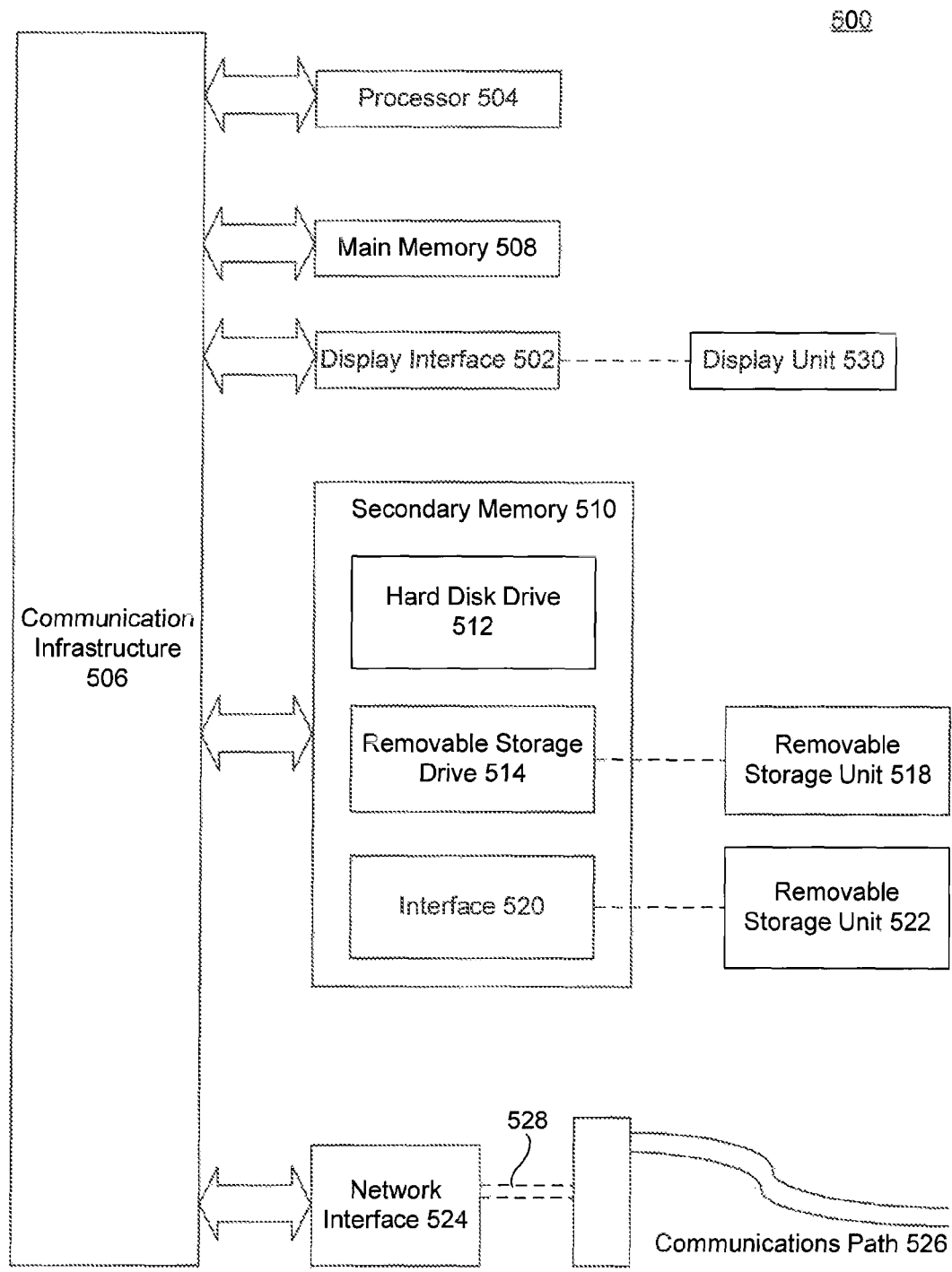
FIG. 5 depicts an example computer system in which embodiments of the present invention may be implemented.

Various aspects of the present invention can be implemented by software, firmware, hardware, or a combination thereof. FIG. 5 illustrates an example computer system 500 in which the present invention, or portions thereof, can be implemented as computer-readable code. For example, the methods illustrated by flowcharts 200 of FIGS. 2 and 400 of FIG. 4 can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the steps in the methods illustrated by flowcharts 200 of FIG. 2 and 400 of FIG. 4, discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VIII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for speaker segmentation and speaker identification of speech input, the method comprising:
   (a) segmenting the speech input into a set of silent segments and a set of speech segments;
   (b) identifying a first speech segment as corresponding to a first speaker, wherein the first speech segment is included in the set of speech segments;
   (c) updating a first speech model corresponding to the first speaker based on the first speech segment, wherein the first speech model is included in a set of speech models;
   (d) identifying a second speech segment as corresponding to a second speaker, wherein the second speech segment is included is the set of speech segments, wherein identifying the second speech segment as corresponding to the second speaker is based on a comparison of correlations to individual speech models in the set of speech models;
   (e) responsive to (d), updating a second speech model corresponding to the second speaker based on the second speech segment, wherein the second speech model is included in the set of speech models;
   (f) correlating an unidentified speech segment from the set of speech segments to one or more speech models in the set of speech models;
   (g) responsive to sufficient correlation of the unidentified speech segment with an individual speech model:
      (1) identify the unidentified speech segment as corresponding to an individual speaker, wherein the individual speaker corresponds to the individual speech model,
      (2) updating the individual speech model based on the unidentified speech segment, and
      (3) marking the unidentified speech segment as an identified speech segment;
   (h) responsive to insufficient correlation, subsequent to step (f), of the unidentified speech segment with an individual speech model:
      (1) adding a new individual speech model to the set of speech models,
      (2) updating the new individual speech model based on the unidentified speech segment, and
      (3) marking the unidentified speech segment as an identified speech segment;
   (i) repeating steps (f), (g), and (h) until individual ones of the speech segments in the set of speech segments are identified as corresponding to individual speakers that correspond to individual ones of the speech models in the set of speech models; and
   (j) for a particular speech segment in the set of speech segments that has previously been identified as corresponding to a particular speech model, identifying a specific speech model from the set of speech models that is different than the particular speech model, wherein the specific speech model has a higher correlation to the particular speech segment than the particular speech model.

2. The method of claim 1, further comprising:
   (k) responsive to a specific speech model being identified for the particular speech segment, in step (j), updating the specific speech model from step (j) based on the particular speech segment.

3. The method of claim 2, further comprising:
   (l) repeating steps (j) and (k) until an individual speech model that has a higher correlation to an individual speech segment than a previously identified corresponding speech model can no longer be identified.

4. The method of claim 1, wherein the first speech model is based on a Universal Background Model (UBM).

5. The method of claim 1, wherein segmenting the speech input includes merging adjacent speech segments that occur in temporal proximity within a temporal proximity threshold, wherein the temporal proximity threshold is 100 ms.

6. The method of claim 1, wherein individual speech segments in the set of speech segments do not overlap in time with other speech segments in the set of speech segments.

* * * * *